United States Patent
Elmardini

(10) Patent No.: US 12,012,291 B2
(45) Date of Patent: Jun. 18, 2024

(54) PARCEL SINGULATION SYSTEMS AND METHODS

(71) Applicant: Körber Supply Chain LLC, DFW Airport, TX (US)

(72) Inventor: Ahmad Elmardini, Coppell, TX (US)

(73) Assignee: Körber Supply Chain LLC, DFW Airport, TX (US)

( * ) Notice: Subject to any disclaimer, the term of this patent is extended or adjusted under 35 U.S.C. 154(b) by 357 days.

(21) Appl. No.: 17/428,411

(22) PCT Filed: Mar. 15, 2019

(86) PCT No.: PCT/US2019/022446
§ 371 (c)(1),
(2) Date: Aug. 4, 2021

(87) PCT Pub. No.: WO2020/190255
PCT Pub. Date: Sep. 24, 2020

(65) Prior Publication Data
US 2022/0127083 A1    Apr. 28, 2022

(51) Int. Cl.
*B65G 47/31* (2006.01)
*B65G 47/14* (2006.01)
*B65G 47/26* (2006.01)

(52) U.S. Cl.
CPC ......... *B65G 47/31* (2013.01); *B65G 47/1492* (2013.01); *B65G 47/265* (2013.01)

(58) Field of Classification Search
CPC ...... B65G 47/31; B65G 47/265; B65G 43/10; B65G 47/1492; B65G 15/10; B65G 15/22; B65G 15/24
See application file for complete search history.

(56) References Cited

U.S. PATENT DOCUMENTS

| | | | |
|---|---|---|---|
| 6,401,936 B1 | 6/2002 | Isaacs et al. | |
| 6,471,044 B1 | 10/2002 | Isaacs et al. | |
| 6,484,886 B1 | 11/2002 | Isaacs et al. | |
| 6,629,018 B2 * | 9/2003 | Mondie | B65G 47/28 700/229 |

(Continued)

OTHER PUBLICATIONS

International Search Report dated Dec. 10, 2019; Application No. PCT/US2019/022446; 8 pages.

*Primary Examiner* — Mark A Deuble
(74) *Attorney, Agent, or Firm* — Price Heneveld LLP

(57) ABSTRACT

Parcel processing systems and methods. A method for singulating parcels includes receiving an input stream of a plurality of parcels (1, 2, 3, 4, 5, 6, 7, 8, 9) including at least a leading parcel (1) and a lagging parcel (2) in a singulator system (10). The method includes updating position information of the leading parcel (1) and the lagging parcel (2) on a list (1650). The method includes determining a leading speed of the leading parcel (1). The method includes determining an actual gap between the leading parcel (1) and the lagging parcel (2). The method includes determining a speed factor between the leading parcel (1) and the lagging parcel (2). The method includes setting a lagging speed of the lagging parcel (2) according to the leading speed and the speed factor. The method includes controlling conveyors (20) to transport the leading parcel (1) at the leading speed and to transport the lagging parcel (2) at the lagging speed.

11 Claims, 11 Drawing Sheets

(56) References Cited

U.S. PATENT DOCUMENTS

| | | | |
|---|---|---|---|
| 6,629,593 B2 * | 10/2003 | Zeitler | B65G 43/08 |
| | | | 198/460.3 |
| 6,694,220 B1 | 2/2004 | Tanz | |
| 6,793,931 B2 * | 9/2004 | Precopio | A01N 31/04 |
| | | | 424/70.31 |
| 7,035,714 B2 * | 4/2006 | Anderson | B65G 43/08 |
| | | | 198/577 |
| 7,090,067 B2 | 8/2006 | Schiesser et al. | |
| 7,233,840 B2 | 6/2007 | Schiesser et al. | |
| 10,781,052 B2 * | 9/2020 | Fourney | B65G 43/10 |
| 10,815,069 B1 * | 10/2020 | Elmardini | B65G 43/08 |
| 10,858,199 B2 * | 12/2020 | Vitalini | G05B 13/0265 |
| 2004/0104100 A1 | 6/2004 | Schiesser et al. | |
| 2007/0246328 A1 * | 10/2007 | Reznik | B65G 43/10 |
| | | | 198/444 |
| 2008/0023302 A1 | 1/2008 | Groom | |
| 2009/0171501 A1 | 7/2009 | Hills | |
| 2018/0215552 A1 * | 8/2018 | Kim | B65G 37/00 |

* cited by examiner

PARCEL SINGULATION SYSTEMS AND METHODS

This application is a national phase filing under 35 U.S.C. § 371 of International Patent Application No. PCT/US2019/022446, filed Mar. 15, 2019, which is incorporated herein by reference in its entirety.

TECHNICAL FIELD

The present invention relates to an apparatus, system and method of organizing a disordered stream of articles into an ordered stream of single items spaced from each other for subsequent processing.

BACKGROUND OF THE DISCLOSURE

In high volume product handling operations, such as mail handling and similar processing, large quantities of items such as boxes, parcels packages or parts often varying widely in size, must be inducted into a sorter system. Typically, a feeder system for use in such processing areas takes a disordered stream of items fed to it on a conveyor and inducts the items onto a sorter system. The feeder system ideally should perform several functions. To the maximum extent possible, the feeder should singulate disordered items in order to present the articles to downstream processing equipment, such as a sorter, one at a time with some minimum specified spacing or separation between product items. The feeder system must also provide for the reading of destination information from the item so that the control system for the sort can track it through the system and sort it correctly. In the U.S., scannable bar codes are used for this purpose in automated systems. A third important function is intercepting and removing items which are non-machinable because they are too large, too heavy or the like from the system for special handling.

Singulation is an important first step in the handling and sorting of product items such as boxes, parcels or soft packages. Parcel singulation, as used herein, refers to the generation of a flow of discrete parcels having no two parcels abreast, stacked, or having a gap or lineal (in the direction of flow) separation less than some minimum value. In other words, singulation is a process whereby a randomly input stream of items moving on a conveyor system is separated into a stream of single items spaced from each other so that a downstream process can readily perform operations on each item one at a time. Mixed item streams are a particular challenge in that a mixed material stream may include packages that vary greatly in size and may be piled at random one upon another, forming agglomerates of packages that are difficult to detect and separate.

Presently, singulation is accomplished in two ways, by manual manipulation of material on bulk conveying lines and with mechanical singulators that rely on the mechanical characteristics of the material being singulated to generate an output stream in which the probability that each parcel is singulated is high. While manual operations can be relatively effective, they are costly; and high throughput, either continuous or in bursts, can exceed an individual's capacity, resulting in "doubles" or "multiples" (unsingulated output). Conventional mechanical singulation schemes vary widely in method, throughput, and error rates, but tend to be large (requiring a large amount of floor space) and subject to high error rates when handling material at the margins of the mechanical material specifications for which they are designed and/or tuned. They too tend to degrade in performance when they encounter heavy bursts of material flow.

Improved systems and methods are desirable.

SUMMARY OF THE DISCLOSURE

Disclosed embodiments relate to systems and methods for parcel processing and singulation, and other devices, systems, and methods as disclosed herein.

A method for singulating parcels includes receiving an input stream of a plurality of parcels including at least a leading parcel and a lagging parcel in a singulator system. The method includes updating position information of the leading parcel and the lagging parcel on a list. The method includes determining a leading speed of the leading parcel. The method includes determining an actual gap between the leading parcel and the lagging parcel. The method includes determining a speed factor between the leading parcel and the lagging parcel. The method includes setting a lagging speed of the lagging parcel according to the leading speed and the speed factor. The method includes controlling conveyors to transport the leading parcel at the leading speed and to transport the lagging parcel at the lagging speed.

Various embodiments include a parcel singulator system having a plurality of conveyors, and a control system connected to control the plurality of conveyors, configured to perform processes as disclosed herein. Various embodiments include a non-transitory computer-readable medium storing executable instructions that, when executed, cause a control system of a parcel processing system to control the parcel processing system to perform methods as disclosed herein.

In various embodiments, the speed factor is a ratio of the actual gap or pitch to a target gap or pitch. In various embodiments, the method is repeated for each of the plurality of parcels. In various embodiments, the target gap is preconfigured based on requirements of downstream equipment. In various embodiments, the leading speed is a predetermined maximum speed at a time the leading parcel exits the singulator. In various embodiments, the leading speed of the leading parcel is a lagging speed of a previous iteration of the method. In various embodiments, the lagging speed is calculated as the ratio of the actual gap to a target gap, multiplied by the leading speed. In various embodiments, based on the leading speed and the lagging speed, the actual gap between the leading parcel and the lagging parcel is substantially equal to a target gap when the leading parcel and the lagging parcel exit the singulator. In various embodiments, the method is performed repeatedly and at a repetition rate sufficient that each of the plurality of parcels is adjusted substantially concurrently and continuously.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
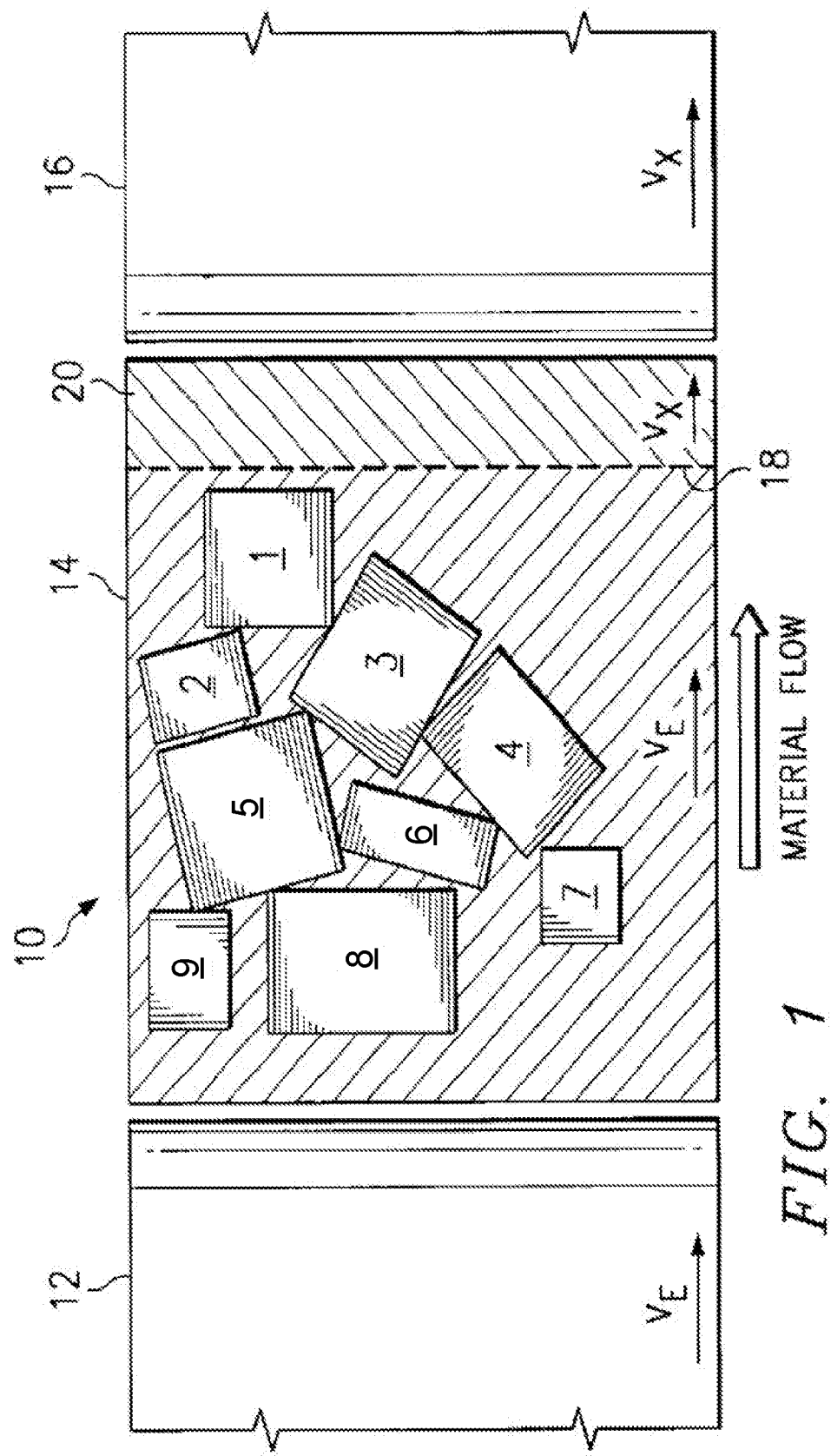
FIGS. 1-3 schematically illustrate an apparatus in accordance with disclosed embodiments.

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

A singulator as disclosed provides a means of generating a stream of single parcels, such as cartons, from a single layer bulk flow, accumulation, or batch containing one or more of said parcels. It is used to convert a bulk material flow or batch to a stream of single items with controlled spacing on a conveying device such as may be needed for some process such as reading or sorting. It accomplishes accurate separation of a wide spectrum of parcels using knowledge of parcel locations, speeds or other dynamics, and other information acquired by various means, computer processing using a straightforward algorithm, and a suitable conveying mechanism to selectively pull parcels piece-by-piece from a single layered, bulk accumulation of parcels, i.e. with an intelligent process.

A parcel singulator will take parcels moving in bulk at its input, and singulate and space those parcels so that, at its output, parcels will come out singulated with at least a minimum gap or pitch between each parcel. Before entering the singulator, parcels will be generally moving in bulk on the conveyor belt and their speed cannot be controlled individually.

Inside the singulator, the parcels will enter a stage of matrix belts, rollers, or other conveyor sections where each parcel's speed can be controlled individually. The singulator will track the position each parcel, from the time it enters the singulator until it exits, such as in a parcel list.

Some systems perform the singulation process by parcel extraction. In such processes, the singulator system can monitor the bulk stream of parcels using the list to calculate the gap for each parcel.

These systems can then assign a state for each parcel, based on its gapping requirements, to be unsingulated, extracting, or singulated. If the gapping requirements are not met, then the parcel will be designated as "unsingulated." If the gapping requirements are met, then the parcel will be designated as "singulated." A parcel assigned as "extracting" is the next unsingulated parcel that has been selected by the system to become singulated.

These systems can then assign a speed to each parcel in the list. If the parcel is singulated, it will be assigned a high or maximum speed. Then the first unsingulated parcel in the list after the singulated parcel will be selected, designated "extracting," and assigned a high speed. Then the rest of unsingulated parcels will be assigned to run at low or minimum speed. This speed differential separates the extracting parcel from the following unsingulated parcel(s) and so causes it to be effectively singulated.

Once the extracting parcel accelerates from low to high speed and becomes singulated, its state is changed to "singulated," and the next unsingulated parcel will be selected for extraction.

Known techniques and systems for parcel handling are described, for example, in U.S. Pat. Nos. 6,484,886, 6,401, 936, 6,471,044, 6,694,220, 6,629,018, 7,090,067, 7,233,840, 7,191,895, 7,413,071, 7,854,314, 8,079,462, 3,485,339, 5,092,451, 5,137,139, and 6,629,593, each of which is hereby incorporated by reference.

In a process as disclosed herein, in contrast to other systems, the dynamics of each parcel can be derived from or based on another parcel to optimally converge the actual dynamics to the target required dynamics of every parcels. In this way, the system can continually track the position and adjust the dynamics of each of the parcels as they are singulated. This allows the system to continuously monitor the parcel dynamics and to tune the speed of each conveyor portion to achieve the target dynamics.

In disclosed embodiments, the system can continue to correct or adjust the gapping between any two parcels even after the initial gapping requirements have been met, until the parcels exit the singulator, producing better accuracy and efficiency as compared to other approaches. A significant advantage of the disclosed techniques is that parcels are not singulated one at a time or forced the "wait" for other parcels to be singulated. Instead, parcel dynamics are effectively being adjusted concurrently for each parcel to optimally converge to the target dynamics in a continuous manner.

Further, disclosed embodiments allow for better flow of parcels within the singulator and at the exit and entry of the singulator. At the exit of the singulator, a system as disclosed herein produces a better, more consistent a flow of parcels, so that the exit of the singulator does not starve for parcels which would cause a drop in parcel throughput and efficiency.

Disclosed embodiments also provide a better input to the next "downstream" parcel processing stage after the singulator. In a parcel processing system incorporating a disclosed singulator, the next stage is enabled handle a higher throughput of parcels based on the more accurate gapping produced by the singulator, versus an input with lower throughput of parcels with less accurate gapping as produced by other system. This allows the direct efficiency improvements of the disclosed singulator stage to be carried to the next stage to improve efficiency across the entire parcel processing system.

In addition, disclosed embodiments provide increased accuracy even with a variation in the input flow of parcels. The techniques disclosed herein allow the input to the singulator to be less susceptible to the variation of flow of parcels, since the parcel gapping can be continuously monitored and adjusted as the singulation process is performed. This added accuracy and efficiency also allows the singulator to be configured at any time to achieve higher speed and performance.

Figure 2:
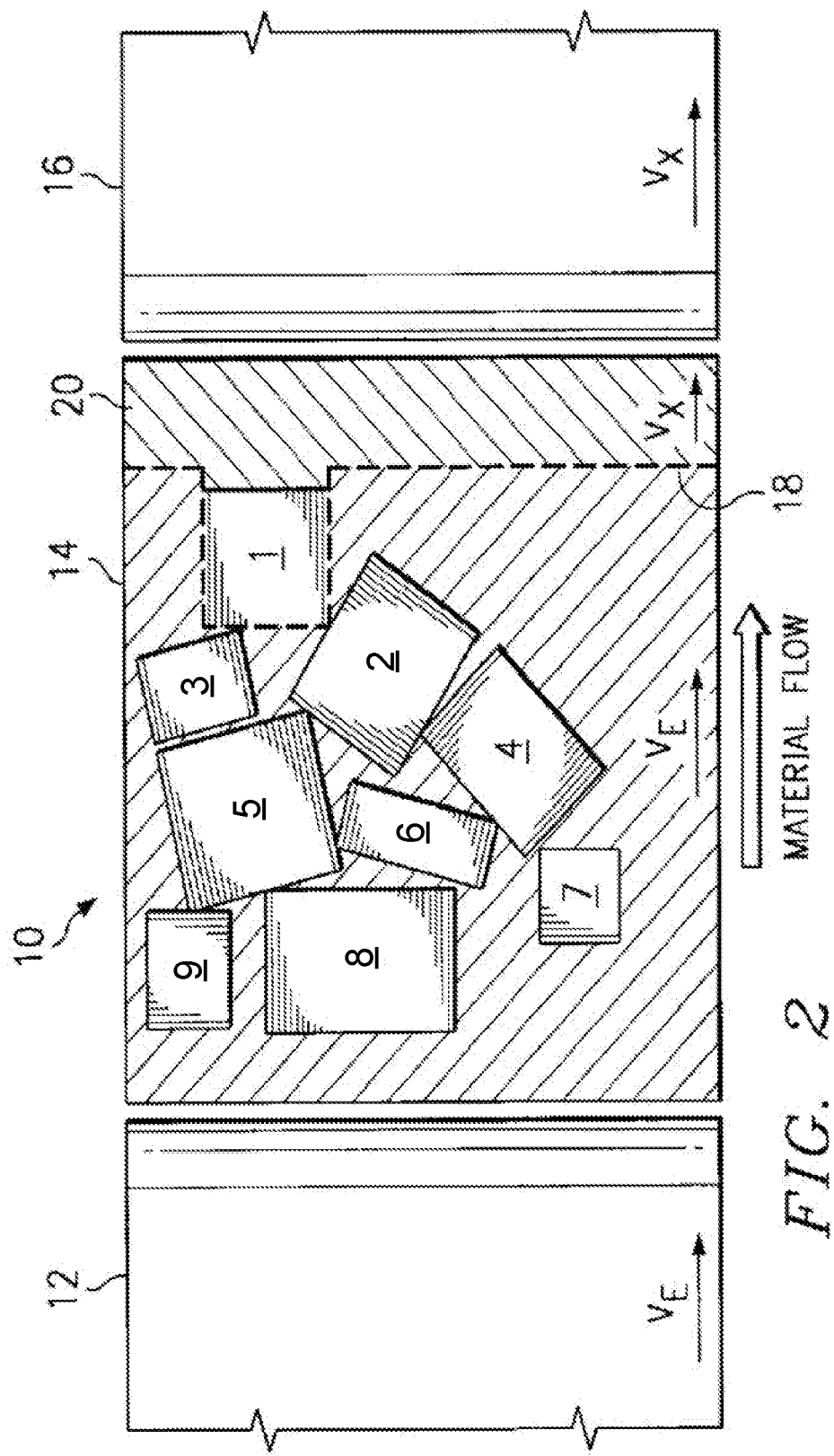
Figure 3:
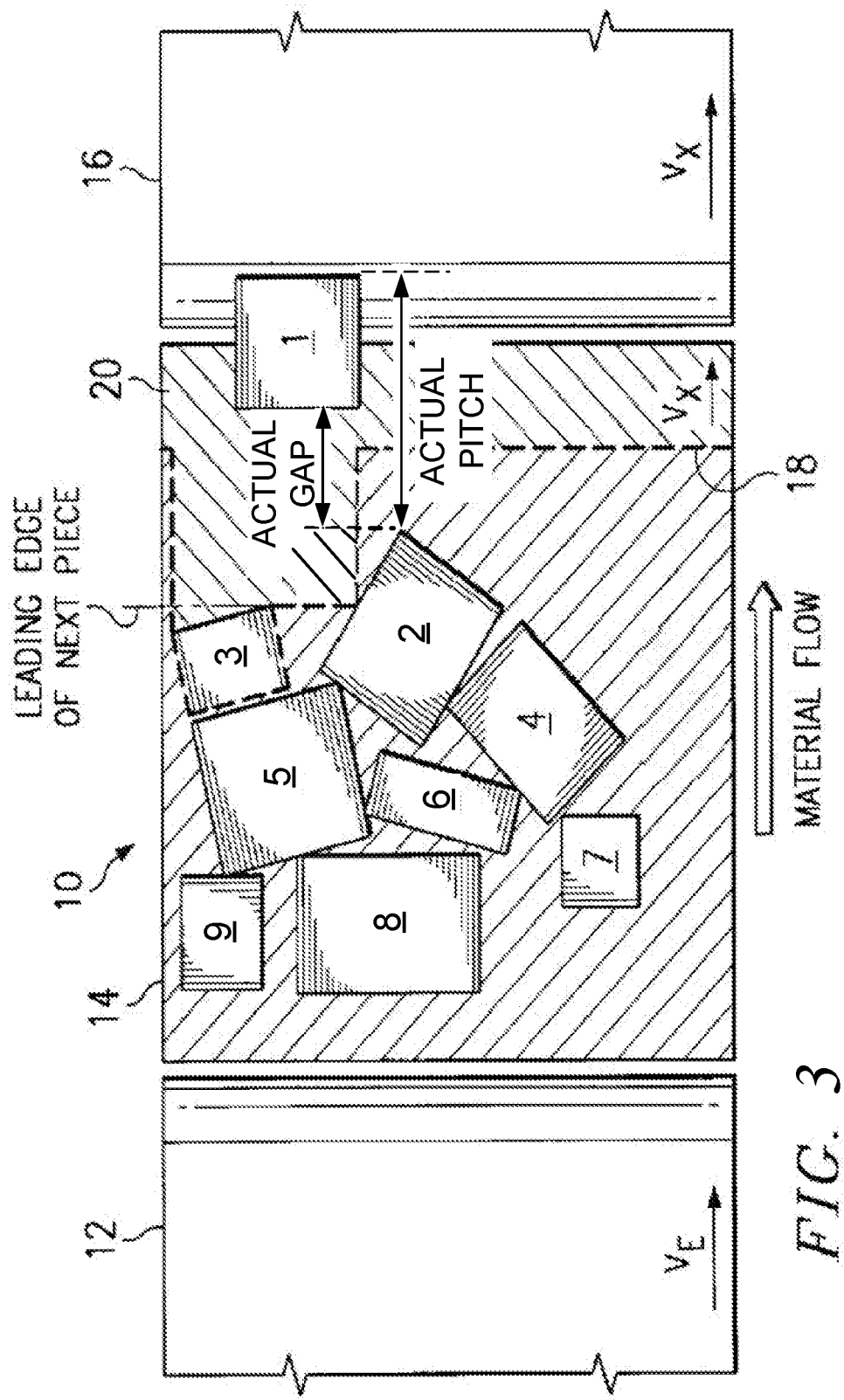
Figure 4:
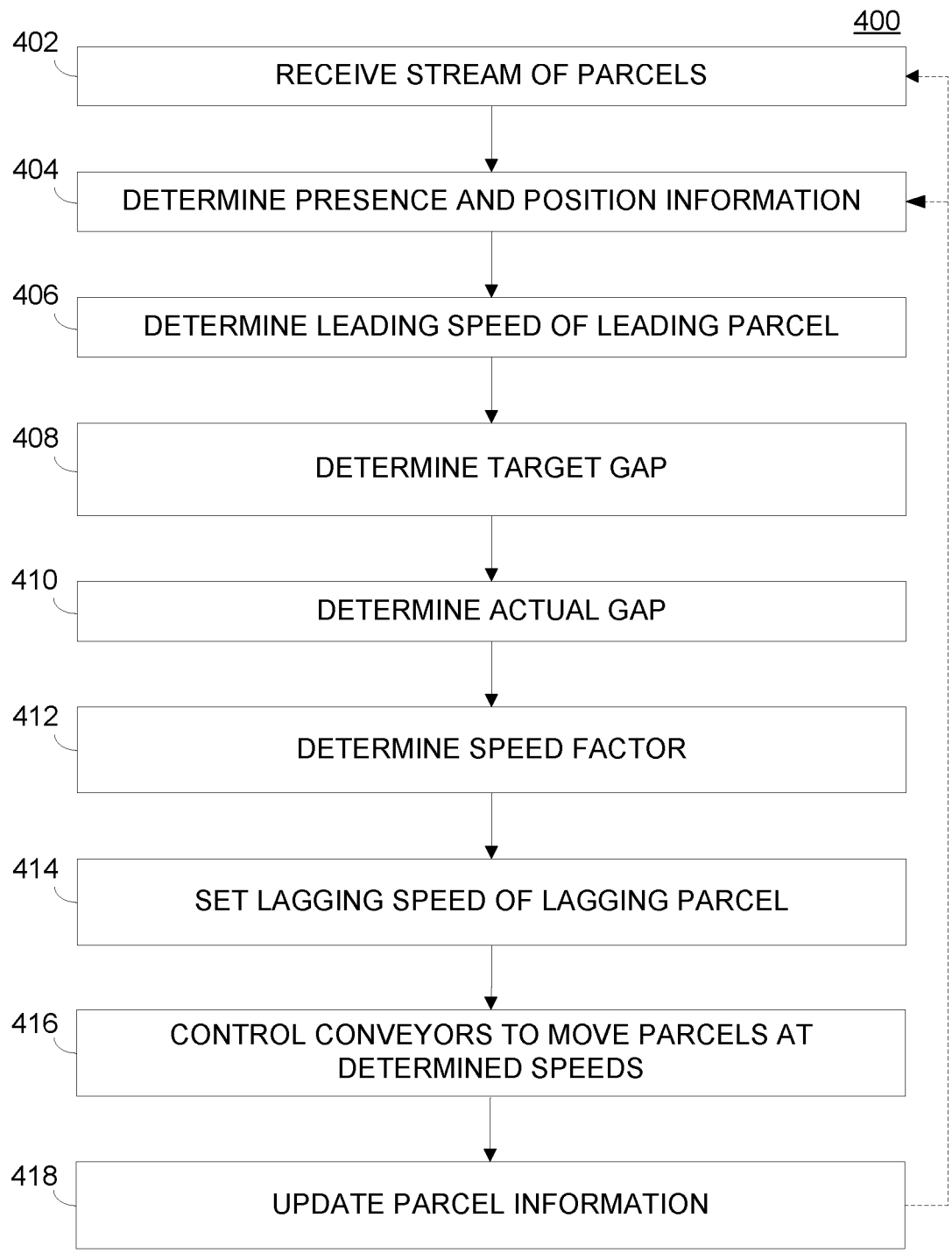
FIG. 4 illustrates a flowchart of a process in accordance with disclosed embodiments.

FIGS. 1-3 schematically illustrate an apparatus 10 (singulator system 10) in accordance with disclosed embodiments. FIG. 4 illustrates a process 400 in accordance with disclosed embodiments, discussed with reference to FIGS. 1-3. A singulator as disclosed herein may be implemented as part of a larger parcel processing system. The singulator and its components are referred to generically as the "system" below.

In a singulation process in accordance with disclosed embodiments, the speed of every parcel can be derived from the parcel in front of it.

The system first receives an input stream of parcels (402). This is typically a bulk stream of non-singulated parcels. For the specific example below, it is assumed that the input stream of parcels is de-stacked—that is, there is only one layer of parcels and none is stacked on top of the other. As used herein, a "parcel" refers to any parcel, package, mail piece, or other object processed as described.

In the example of FIG. 1, a stream of parcels 1-9 are conveyed via infeed conveyor 12 at entry velocity $V_e$ onto singulator 14. Parcels 1-9 are conveyed from the singulator with takeaway conveyor 16 at exit velocity $V_x$. The velocity boundary between $V_e$ and $V_x$ is schematically represented by line 18.

As shown in FIG. 1, accumulated parcels 1-9 are moved fully onto the singulator 14. Conveyors 20 on the singulator such as belts or rollers move the parcels 1-9 at entry velocity $V_e$ until the singulator 14 is full or near full. $V_e$ can then drop to zero, if necessary, as the already accumulated parcels are singulated.

Note that the conveyors 20 can be implemented by any combination of belts, rollers, or other physical structures that transport the parcels. In particular, in various embodiments, the conveyors 20 are implemented by a plurality of individually-controllable conveyor portions, such as individual belts or sets of rollers, so that the transport speed of any particular conveyor portion can be adjusted as described herein.

The system determines the presence and position information of a plurality of the parcels in the input stream of parcels (404). The determination can be initially detecting or thereafter updating this information. This can be performed using, for example, image information capturing devices as described herein or other detection systems. The while the presence of the parcels need only be detected for a first iteration of the process of FIG. 4, the position information can be detected and updated on subsequent iterations.

The system creates or updates a list of the detected plurality of the parcels in the input stream of parcels that includes the position information of each of the plurality of parcels (404). The list can include all of the parcels or only a subset of the parcels. For purposes of this discussion, the list includes at least a leading parcel and a lagging parcel. The list can be created, for example, when the parcels are first fed into and received by the singulator for a first iteration of the process of FIG. 4, then can be updated on subsequent iterations. The "list" can be in a linked list, array, or other data structure. The term "list" may be used herein without any limitation to a particular data structure. Each parcel's position can be tracked, for example, using the coordinates of the vertices of each parcel. The list can be sorted based on the distance of each parcel from the exit of the singulator (or other fixed point). As any particular parcel is received in the singulator, it can be added to the list. Similarly, as any particular parcel exits the singulator, it can be removed from the list. In some embodiments, the list is not particular to the singulator itself, and is part of tracking information maintained for the parcels as they are processed throughout an overall parcel processing system.

The "leading parcel" refers to the parcel that is ahead of the lagging parcel—that is, its position information indicates that it is closer to the exit of the singulator at takeaway conveyor 16 than is the lagging parcel, and generally refers to the parcel that is closest to the exit of the singulator. The leading parcel, when it is the actual closest parcel to the exit of the singulator, can be assigned a speed equal to exit velocity $V_x$. The gapping requirements as described below can be calculated based on the leading parcel with respect to the lagging parcel.

The "lagging parcel" refers to the parcel behind the leading parcel—that is, its position information indicates that it is the next-closest parcel to the exit of the singulator, following the leading parcel. The speed of the lagging parcel, as described below, is derived from or based on the leading parcel in order for the leading parcel to satisfy its gapping requirements. As may be seen from the discussion below, the speed of any given lagging parcel—that is, any parcel that has a leading parcel in front of it—can be calculated based on its particular leading parcel, regardless of where that lagging parcel is in the actual order of the parcels being processed.

As will be appreciated, any parcel, except for the parcels actually closest to the input of the singulator or to the exit of the singulator, may function as the lagging parcel in terms of setting its own speed based on the speed of its leading parcel, and may at the same time function as the leading parcel upon which the speed of the following lagging parcel is based.

In the examples of FIGS. 1-3, parcel 1 is the leading parcel and is also actually closes to the exit of the conveyor. Parcel 2 is chosen as the lagging parcel, since it is behind parcel 1 and there are no parcels in between them. Parcel 3 could likewise have been chosen, in this example, as the lagging parcel, since it also is behind parcel 1 and there are no parcels in between them. When using parcel 2 as the lagging parcel, in this example, it will be understood that the result of the process is to move parcel 2 ahead of parcel 3, so that in a next iteration, parcel 2 can be considered the leading parcel and parcel 3 can be considered the lagging parcel.

The "target gap" refers to the gap that is required for the leading parcel to meet its gapping requirements relative to the lagging parcel; it is the minimum required gap between the leading parcel and the lagging parcel.

The "actual gap" refers to the current actual gap that it is between the leading parcel and the lagging parcel. The actual gap can be calculated from the perspective of the leading parcel relative to the lagging parcel. Generally speaking, the singulator operates most efficiently when, at the exit, the parcels are moving at exit velocity $V_x$, the speed of the next stage of the parcel processing system, and the actual gap between any two parcels matches the target gap.

The system determines the "leading speed" of the leading parcel (406). If the leading parcel is the first parcel in the list (the parcel nearest to the exit or other fixed point of the singulator), the leading speed can be a maximum speed, such as exit velocity $V_x$, the speed of the next parcel-processing stage after the singulator. When the leading parcel is the first parcel on the list, if it is not already being transported at the maximum speed, determining the leading speed for that leading parcel can include assigning the maximum speed to that leading parcel and thereafter transporting that leading parcel at the maximum speed.

In other cases, for example when this process is iterating, the leading speed is known based on its previous determination as described below. In other cases, the leading speed can be determined according to the speed at which the conveyor portion that is transporting the leading parcel is operating.

Conceptually, as illustrated in FIG. 2 and when the leading parcel is actually the nearest parcel to the exit of the conveyor, the boundary between entry and exit velocities of the conveyors on the singulator has been extended forward to the trailing edge of the leading parcel 1. Leading parcel 1 can be accelerated to exit velocity $V_x$ (which is determined to be the leading speed) and moves forward away from the remainder of the stationary batch of accumulated items. Note that while this example shows all the other parcels 2-9 still moving at entry velocity $V_e$, as described below, each of the subsequent parcels 2-9 is a lagging parcel to some other parcel and can have its speed adjusted as described.

FIG. 2 also illustrates the difference between the gap and the pitch between two parcels. As illustrated, the actual gap between parcel 1 and parcel 2 is the lateral separation distance between the trailing edge (or point) of parcel 1 and the leading edge (or point) of parcel two. This may be compared to the actual pitch between parcel 1 and parcel 2, which is the lateral separation distance between the leading edge (or point) of parcel 1 and the leading edge (or point) of parcel two. The gap represents the distance between the trailing edge or point of one parcel and the leading edge or point of a following parcel, where the pitch represents the distance between the leading edges or points of successive parcels. In some case, where there is overlap between leading and lagging parcels, the gap may be a negative value, but the pitch will remain a positive value. Various embodiments may use the pitch between two parcels to determine speeds or other dynamics, while at the same time achieving a target gap between those parcels at the exit of the singulator.

Note that, while the example below is directed to ensuring that the parcels are singulated at substantially a target gap at the exit of the singulator, similar techniques can be applied to ensure that the parcels are singulated at substantially a target pitch at the exit of the singulator or are singulated so that the centerlines/centerpoints of each parcel are spaced at substantially a target distance at the exit of the singulator.

The system can then determine the target gap between the leading parcel and the lagging parcel (408). In addition to being expressly loaded, retrieved, received, or calculated, the target gap may be preconfigured in the system based on the requirements of the downstream processes or equipment. Similarly, parcel pitch or other dynamics can be determined or preconfigured in the system based on the requirements of the downstream processes or equipment.

The system can then calculate, measure, or otherwise determine the current or actual gap between the leading parcel and the lagging parcel, along with any other relevant dynamics (410).

Turning to FIG. 3, the system can measure the gap between the trailing edge of leading parcel 1 and the leading edge of trailing parcel 2 to determine the actual gap and/or pitch between the leading parcel 1 and the lagging parcel 2.

The system can then determine a speed factor between the leading parcel and the lagging parcel, such as by dividing the current gap to the target gap (412). The "speed factor," in various embodiments, is calculated as the ratio of the actual gap to the target gap:

$$\text{Speed Factor} = \frac{\text{Actual Gap}}{\text{Target Gap}}$$

In other cases, for example when an "overlap" is parcels could result in a negative speed factor, the speed factor can be calculated as the ratio of actual pitch to target pitch. For example, the target pitch can represent a value greater than the maximum length of a parcel, sufficient to eliminate overlap between parcels:

$$\text{Speed Factor} = \frac{\text{Actual Pitch}}{\text{Target Pitch}}$$

In still other cases, the speed factor can be calculated in a hybrid manner so that it is calculated based on pitch when the parcels are overlapping, and then calculated in another iteration based on gap once the parcels are no longer overlapping. This is just an example as other equations, dynamics, and relationships could be used as the speed factor to optimally move each parcel to be spaced at the target gap. The speed factor is one example or illustration to that can be used to control the operations of the singulator.

In still other cases, the lagging speed can be derived from control equations and dynamics between the lagging parcels and leading parcel.

The system can then set a "lagging speed" of the lagging parcel to the speed of the leading parcel times the speed factor (414):

Lagging Speed=(Speed Factor)(Leading Speed)

For example, when the gap ratio is used as the speed factor, this would be:

$$\text{Lagging Speed} = \left(\frac{\text{Actual Gap}}{\text{Target Gap}}\right)(\text{Leading Speed})$$

Note that the lagging speed calculation can include, in some cases, other factors. For example, based on the distance of the lagging parcel from the exit of the singulator at the time of the adjustment, a weighting factor can also be applied to ensure that the lagging parcel "catches up" or "falls back" to the target gap distance by the time the lagging parcel exits the singulator.

Note also that the lagging speed may be greater than the "maximum speed" discussed above, when the actual gap is greater than the target gap, so that the lagging parcel can catch up to the leading parcel at the target gap distance.

Further, in other cases, it will be understood that when the leading parcel actually exits the conveyor, the lagging parcel is no longer lagging at all and is only a leading parcel to its following parcel. In this case, the now-leading parcel can be assigned a speed regardless of its former leading parcel; for example, it can be assigned the exit velocity $V_x$.

The system can then control the conveyors (or conveyor sections) to move the leading and lagging parcels at their respective speeds, adjusting each conveyor section speed as necessary (416). Doing so singulates the leading parcel from the lagging parcel and causes the actual gap between those parcels to approach, equal, or substantially equal the target gap. In various embodiments, based on the leading speed and the lagging speed, the actual gapping and dynamics between the leading parcel and the lagging parcel can be made substantially equal to a target gapping and dynamics when the leading parcel and the lagging parcel exit the singulator.

As the parcels are transported, the system can update the list with current position information or other information for each parcel (418). For example, the determined lagging speed for each parcel can be stored in the list, and that value can be used as the leading speed for calculating the lagging speed of the next parcel.

The process of FIG. 4 process can iterate thru the entire list of parcels, by repeating to 402 (if parcels are still being received) or 404, where the current lagging parcel will become the leading parcel and the next parcel in the list will become the lagging parcel.

Moreover, the process of FIG. 4 can be repeatedly or continually executed so that the speed of each lagging parcel is continually adjusted according to the speed of its leading parcel, by controlling the conveyors, to make the actual gap between any two parcels to be as close to the target gap as possible. For example, the iterations through the process of FIG. 4 can occur rapidly enough that the parcel speeds and other dynamics are effectively being adjusted continually and concurrently as the parcels are received into the singulator, singulated and gapped, and moved out of the singulator. In one non-limiting implementation example, each iteration through the process is performed in a 33 ms cycle.

Disclosed processes provide a much more effective and efficient singulation process than processes that only adjust the speed of one parcel at a time, such as successively moving each parcel to the exit velocity while the others move are stationary or moving at only a slower constant velocity. In disclosed embodiments, as the stream of parcels enters the conveyor, the speeds of all received parcels are, in effect, immediately, concurrently, and constantly adjusted to achieve proper singulation with the target gap.

Another method for singulating parcels can include receiving an input stream of a plurality of parcels including at least a leading parcel and a lagging parcel in a singulator system. This method can include updating position and dynamics information of the leading parcel and the lagging parcel on a list. This method can include determining a leading speed and dynamics of the leading parcel. This method can include determining an actual and target gapping and dynamics between the leading parcel and the lagging parcel. This method can include determining the control/dynamics equations and relationships between the leading parcel and the lagging parcel, such as using a speed factor as described herein. This method can include setting a lagging speed and dynamics of the lagging parcel derived from the equations and properties of the previous step to optimally converge the actual gapping and dynamics to the target gapping and dynamics. This method can include controlling conveyors to transport the leading parcel at the leading speed and to transport the lagging parcel at the lagging speed.

Another method for singulating and gapping parcels includes receiving an input stream of a plurality of parcels including at least a leading parcel and a lagging parcel in a singulator system. The method includes updating position and dynamics information of the leading parcel and the lagging parcel on a list. The method includes determining a leading speed and dynamics of the leading parcel. The method includes determining an actual gapping and dynamics between the leading parcel and the lagging parcel. The method includes determining the control and dynamics equations between the leading parcel and the lagging parcel, such as the exemplary speed factor discussed above. The method includes setting a lagging speed and dynamics of the lagging parcel derived from the control and dynamics equations between the leading and lagging parcels. For example, the lagging speed can be calculated as the product of the leading speed and the speed factor. The method includes controlling conveyors to transport the leading parcel at the leading speed and to transport the lagging parcel at the lagging speed. Further, in some cases, parcels dynamics are being adjusted concurrently and at the same time to optimally converge to the target dynamics in a continuous manner.

Figure 5:
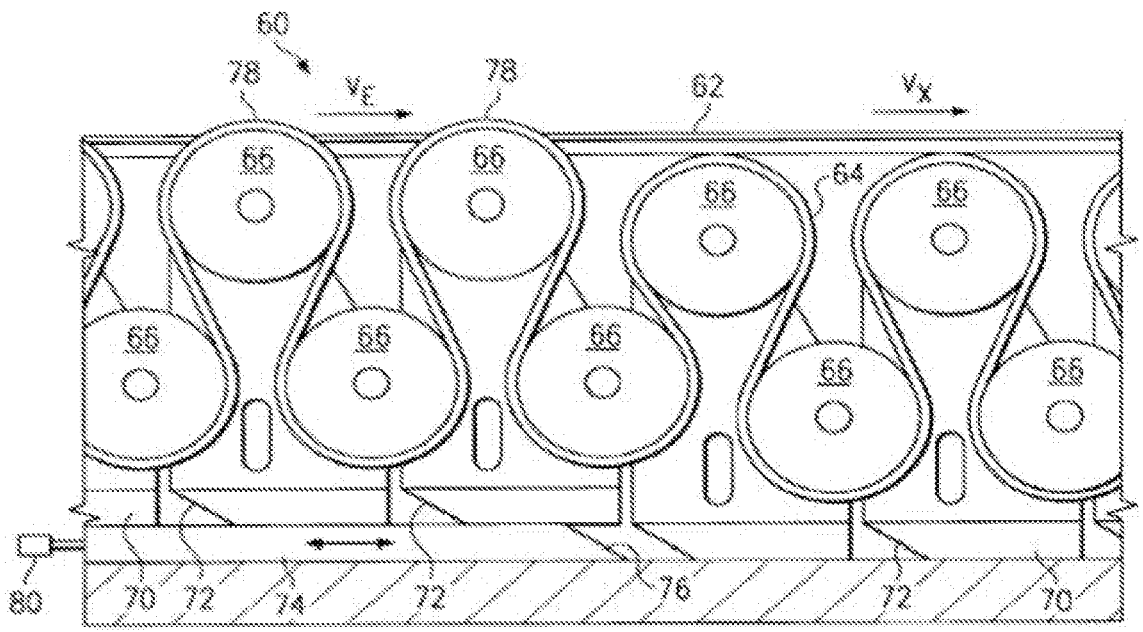
FIGS. 5 and 5A illustrate a raised belt continuous mode apparatus in accordance with disclosed embodiments.
Figure 5A:
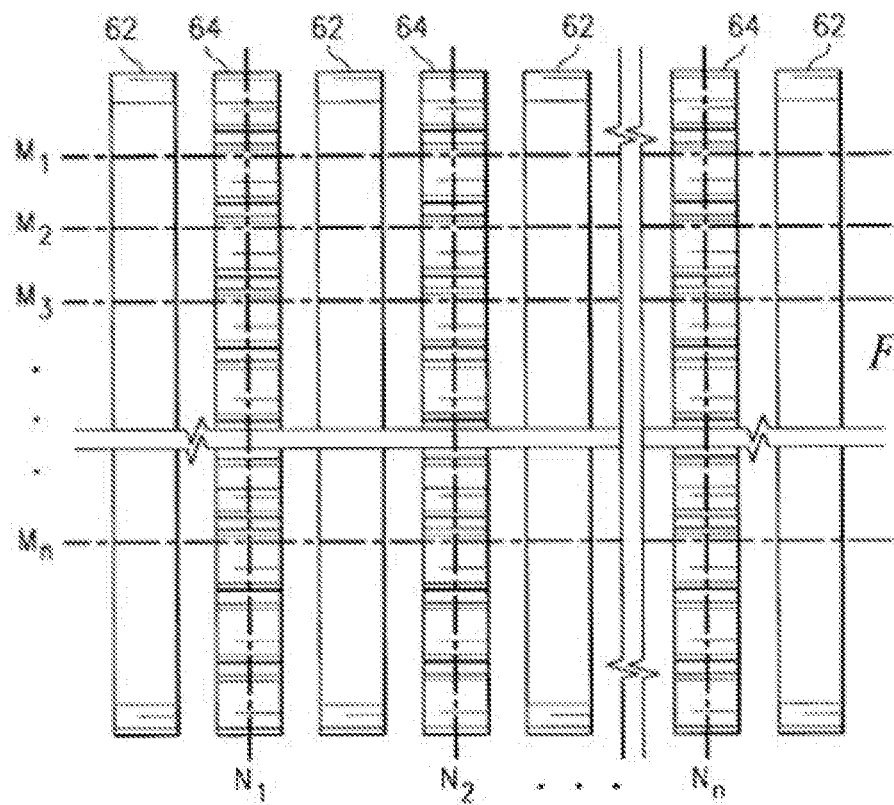

Referring now to FIGS. 5 and 5A, a raised belt continuous mode apparatus 60 corresponding to one embodiment of the conveyors 20 is disclosed. In embodiments of this type, narrow slider belts 62, supported by a flat, low-friction surface, and driven at one velocity, either entry velocity $V_e$ or exit velocity $V_x$, are interleaved with narrow belts 64, such as elastic "O" belts, driven at the other velocity. The second set of belts 64 are wrapped in serpentine fashion around pairs of rollers 66 as shown in FIG. 5. The upper surface of a serpentine belt is normally slightly below that of the slider belts 62. Engagement of the serpentine belt with the bottom surface of conveyed material is achieved by raising a selected roller pair so that the upper surface 78 of belt 64 is raised slightly above the surface of the adjacent slider belts 62. In the illustrated embodiment, columns 70 are each provided with an inclined face 72 that is engaged by an inclined surface 76 of cam member 74 as the member is advanced, raising the column. This raises the pair of rollers 66 associated with the column 70 until the upper surface of belt 64 is above the adjacent slider belts 62. Actuating the cam member 74 to raise roller pairs 66 can be achieved by electrical means, such as a solenoid 80, a pneumatic or hydraulic cylinder, a motor using a screw-type drive or other mechanical means. As best shown in FIG. 5A, the parcel being transported using a raised belt embodiment may be moved by raising a pair or pair(s) of rollers 66, each corresponding to longitudinal column or column(s) n consisting of m roller pairs. Thus, only n actuators are required as opposed to m×n, where m represents the number of lateral rows of columns.

Figure 6:
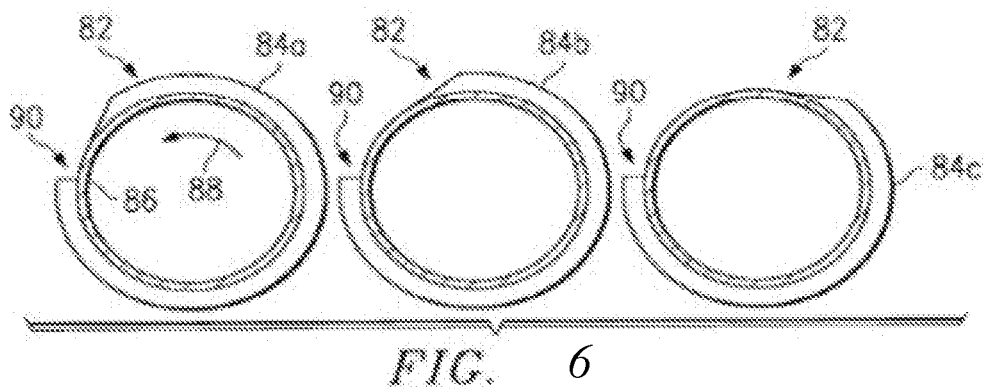
FIG. 6 illustrates an alternate cam member in accordance with disclosed embodiments.

FIG. 6 illustrates an alternate cam member 82 for use in connection with the embodiment illustrate in FIG. 5 is illustrated. As shown, cam members 84(*a*)-84(*c*) are arranged along the length of tube 86, each tube corresponding to a successive column or columns 70 and each cam member corresponding to a row. As will be appreciated, as the tube 86 is rotated in the direction indicated by arrow 88, cams 84(*a*)-84(*c*) will successively engage corresponding columns, raising the corresponding roller pair or pairs. As will also be appreciated, when the tubes 86 are rotated through 360.degree. to the location designated by arrows 90, to the cams 84(*a*)-84(*c*) will simultaneously disengage allowing all of the columns corresponding to belt 64 to lower at one time. Tubes 86 may be actuated and rotated with an electric solenoid or motor, a hydraulic or pneumatic cylinder or other mechanical or electrical devices, depending upon the application.

Figure 7:
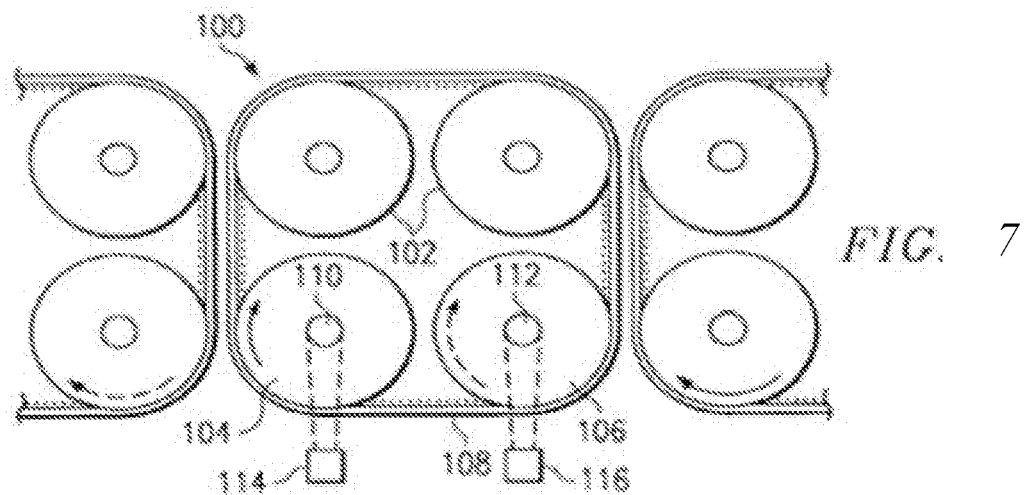
FIG. 7 illustrates a locally-clutched belt continuous mode apparatus in accordance with disclosed embodiments.

FIG. 7 illustrates a locally-clutched belt continuous mode apparatus 100 corresponding to another embodiment of conveyors 20. In this embodiment, the bed or upper surface of the singulator 34 is populated with an array or matrix of short belts 108. Each belt 108 is wrapped around two idler rollers 102 that the conveyed material, and two clutched drive rollers, 104 and 106. Each of the drive rollers 104 and 106 is mounted on a shaft, 110 and 112, respectively, rotating at a speed associated with either entry or exit velocity. Clutches 114 and 116 corresponding to drive rollers 104 and 106 are selectively engaged or disengaged to cause the belt to move at the appropriate velocity. For example drive roller 104 may be configured to operate at a constant velocity where as drive roller 106 maybe configured to operate at a controlled speed. The drive for each belt 108 is intelligently selected, either constant velocity or controlled velocity, to move one or more parcels downstream at the constant velocity while retarding others as required to achieve a downstream flow of single parcels separated by a controlled target gap as discussed herein. As used herein, the terms "intelligence" and "intelligently" refers generally to the use of a means of capturing and generating image information for parcels such as a camera or vision system or an array of physical measuring devices such as photocells, pressure sensors, and similar devices, information that is transformed via suitable algorithms into location and other information for individual parcels and subsequently used by a computer or microprocessor to control the operation of discrete elements such as apparatus 100.

Figure 8:
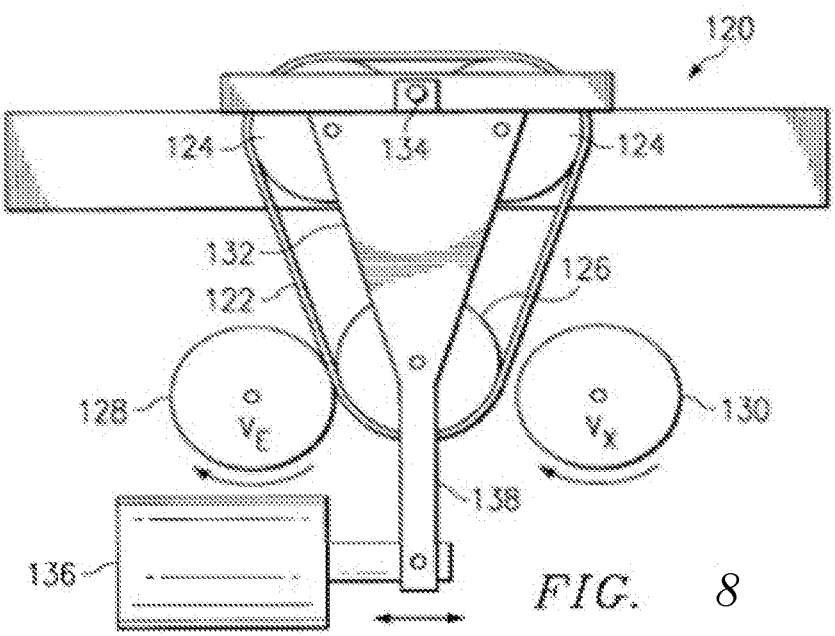
FIG. 8 illustrates a three-roller locally driven belt continuous mode apparatus in accordance with disclosed embodiments.

FIG. 8 shows a three-roller locally driven belt continuous mode apparatus 120, comprising another alternative embodiment of conveyors 20, is shown. In this embodiment, the singulator bed is populated with an array of short belts 122 that support conveyed material. Each belt 122 is wrapped around two idler rollers 124 that support the weight of the conveyed material and a third idler roller 126 well below the surface of the bed. As shown, idler rollers 124 and 126 are mounted on a frame 132. Frame 132 is in turn pivotable around drive engagement pivot pin 134. A solenoid 136 or similar actuator is coupled to a lower section of frame 132 in order to selectively pivot the frame. Drive rollers 128 and 130 are mounted adjacent to lower idler roller 126 and are operated at rotational speeds corresponding to entry velocity $V_e$, exit velocity $V_x$, or other speed controlled as described herein.

As will be appreciated, actuator 136 may selectively pivot frame 132 causing belt 122 to be engaged by either of drive rollers 128 and 130, surfaces of which are moving at either entry velocity or exit velocity, where the belt wraps around idler roller 126. Thus, the drive for each belt 122 maybe intelligently selected, corresponding to either entry velocity $V_e$, exit velocity $V_x$, or other speed controlled as described herein, to move one or more parcels downstream while retarding others as required to achieve a downstream flow of single parcels separated by a controlled target gap as discussed herein.

Figure 9:
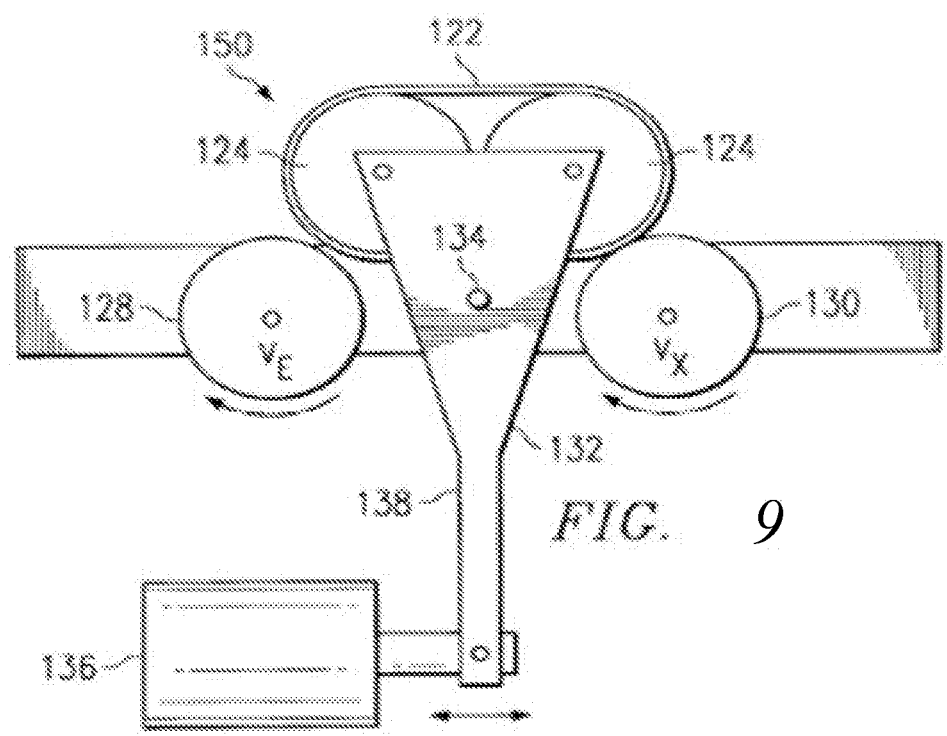
FIG. 9 illustrates a two-roller locally driven belt continuous mode apparatus in accordance with disclosed embodiments.

FIG. 9 illustrates a two-roller locally driven belt continuous mode apparatus corresponding to yet another embodiment of conveyors 20. The apparatus 150 is in all respects similar to the apparatus shown in FIG. 8 with the exception that the third idler belt 126 of apparatus 120 is omitted. Instead, each belt 122 is wrapped around two idler rollers 124 that support the weight of the conveyed material. Where belt 122 wraps around each of the idler rollers 124 the belt may be selectively engaged either of drive rollers 128 and 130 whose surfaces is moving at entry velocity $V_e$, exit velocity $V_x$, or other speed controlled as described herein, by means of actuator 136 pivoting frame 132.

Figure 10:
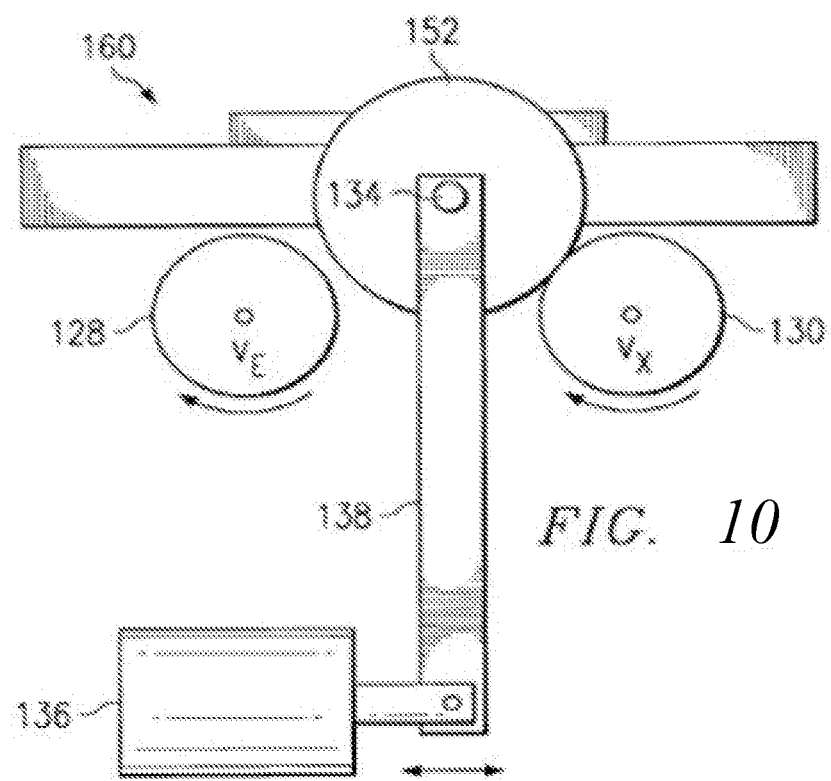
FIG. 10 illustrates a locally driven roller continuous mode apparatus in accordance with disclosed embodiments.

FIG. 10 illustrates a locally driven roller continuous mode apparatus 150 corresponding to an additional embodiment of conveyors 20. In this embodiment, the bed of the singulator is populated with an array of rollers 152 that support conveyed material. Each roller 152 is moveable for engagement with either drive roller 128 whose surface is moving at entry velocity $V_e$ (or other speed) or with a drive roller 128, whose surface is moving at exit velocity $V_x$ (or other speed). Thus, the drive for each locally driven roller apparatus 160 may be intelligently selected, corresponding to entry velocity $V_e$, exit velocity $V_x$, or other speed controlled as described herein, to move one or more parcels downstream while retarding others as required to achieve a downstream flow of single parcels separated by a controlled target gap as discussed herein.

Figure 11:
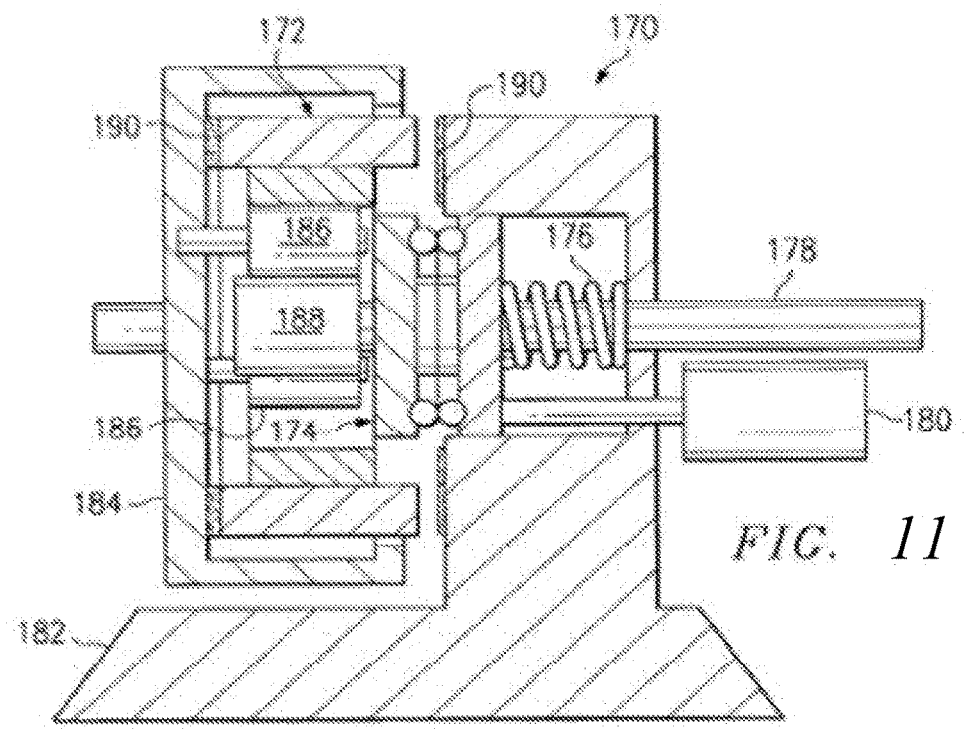
FIGS. 11 and 11A illustrate a drive for a fixed ratio belt continuous apparatus in accordance with disclosed embodiments.
Figure 11A:
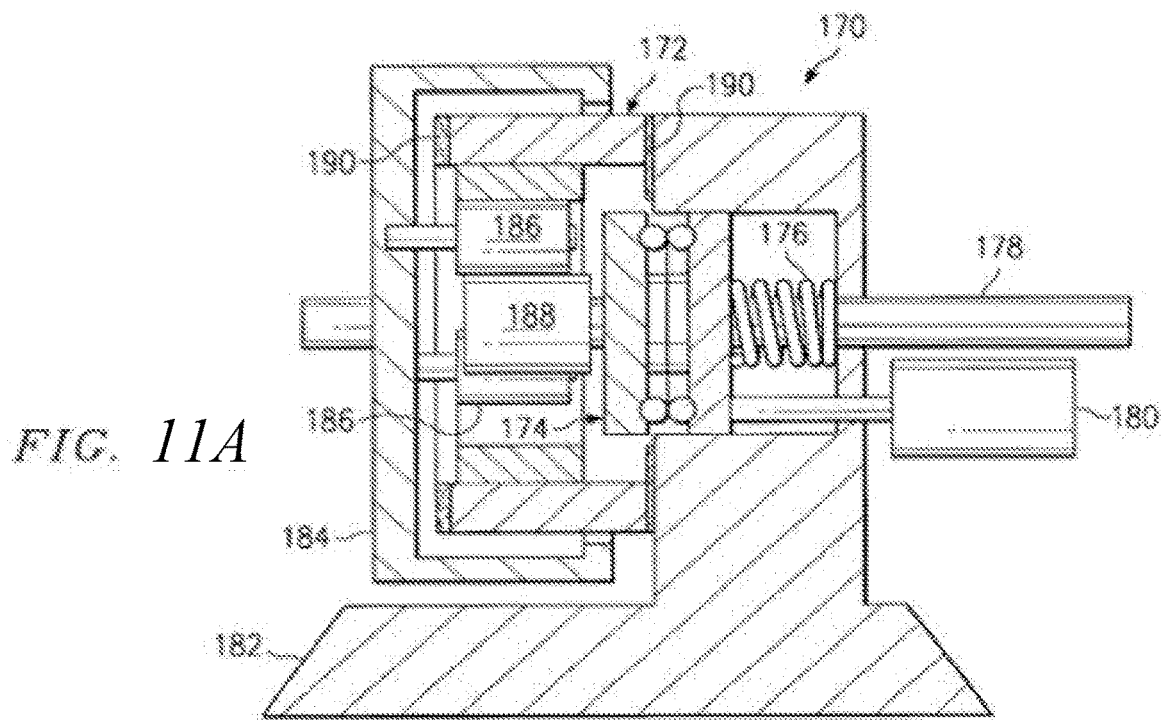

FIGS. 11 and 11A illustrate a drive 170 for a fixed ratio belt continuous apparatus. In this embodiment a planetary mechanism, gear or friction engaged, and two clutches in a drive roller are used to generate two velocities from a single drive shaft. The planetary drive includes drive shaft 178, frame 182, an outer rotational element (gear or roller) 172, a clutch engagement element 174, clutch pads 190, an inner rotational element (gear or roller) 188 coupled to drive shaft 178, middle rotational elements (gears or rollers) 186 and a planetary middle rotational element (axles and dual speed roller). An actuator such as a solenoid or hydraulic or pneumatic cylinder 180 actuates the clutch for engagement between the outer planetary element and the middle element for shaft velocity or between the outer planetary element to the frame for low velocity as shown in FIG. 11A.

Figure 12:
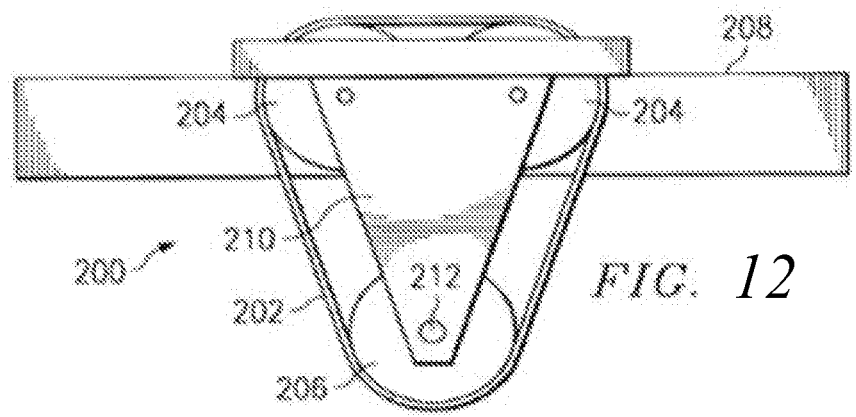
FIG. 12 illustrates a fixed-ratio belt continuous apparatus in accordance with disclosed embodiments.

FIG. 12 illustrates a fixed-ratio belt continuous apparatus that is yet another embodiment of conveyors 20 for use in connection with the singulator of the invention. Conveying belt 202 passes over a pair of idler rollers 204 and dual-velocity drive roller 206, all of which are mounted in a roller/belt frame 210. Dual-velocity drive roller 206 includes a drive shaft 212 for coupling the drive roller to a two-speed drive, such as the planetary drive illustrated in FIGS. 11 and 11A. In this embodiment, planetary mechanism 170 (gear or friction engaged) is used to generate two velocities from a single drive shaft. Thus, each fixed-ratio belt apparatus 170 maybe intelligently driven at one of the two speeds corresponding to the outputs of the planetary drive 170 by means of actuator 180, to move one or more parcels downstream while retarding others as required to achieve a downstream flow of single parcels separated by a controlled target gap.

Figure 13:
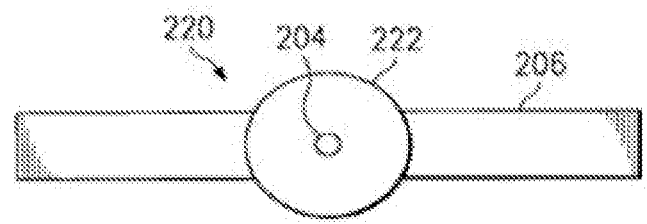
FIG. 13 illustrates a fixed ratio roller continuous apparatus in accordance with disclosed embodiments.

FIG. 13 illustrates a fixed ratio roller continuous apparatus 220 corresponding to a further embodiment of conveyors 20. The apparatus includes a dual-velocity drive roller 222 mounted in a supporting structure 206. The drive roller 222 includes a drive shaft 204 that maybe coupled to a two-speed drive such as the planetary apparatus illustrated in FIGS. 11 and 11A and operated in the same fashion described above in connection with the fixed-ratio belt apparatus 200 illustrated in FIG. 12.

Figure 14:
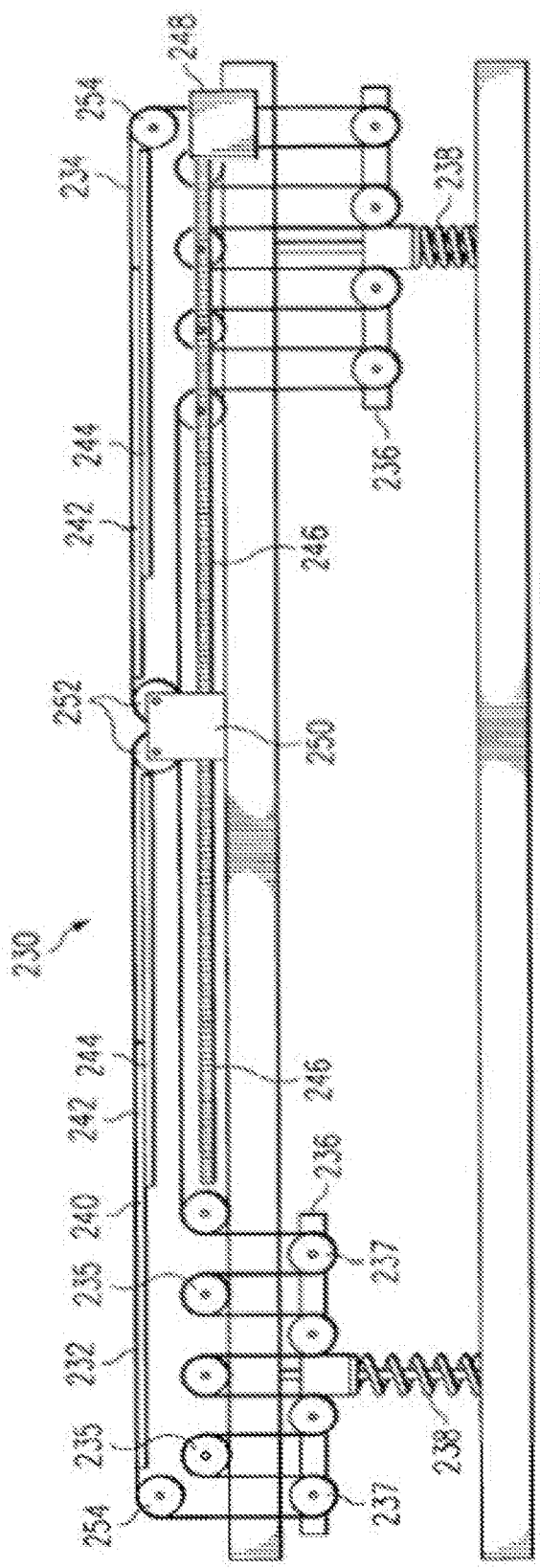
FIG. 14 illustrates a continuous conveying apparatus in accordance with disclosed embodiments.

Turning now to FIG. 14, there is illustrated a continuous conveying apparatus 230 for use as an embodiment of conveyors 20. As shown, the apparatus 230 includes extendable belts 232 and 234 operating at entry velocity $V_e$, exit velocity $V_x$, or other speed controlled as described herein. As will be appreciated, embodiments of the invention using this type of conveyors are based not on an array of discrete points (FIG. 23), but on a set of long, narrow columnar structures that support two narrow in-line belts, one driven at entry velocity and the other at exit velocity.

Each of belts 232 and 234 pass around idler rollers 252, end rollers 254 that maybe drive rollers, and through a series of tension rollers 237 and idler rollers 235 in a serpentine path. Tension rollers are 237 are mounted in a moveable frame 236 that is spring-loaded by spring 238 to allow for take up and let out of the belts 232 and 234 as the support 250 is moved longitudinally by means of screw drive 246. Each of belts 232 and 234 is supported by a slider belt support 240 which as shown includes overlapping sections 242 and 244 that may be moved relative to each other by screw drive 246. Screw drive 246 is actuated by screw drive motor 248 which in turn is intelligently controlled to vary the position of support 250 to move one or more selected parcels downstream in the manner discussed in connection with FIGS. 7-12 to achieve a downstream flow of single parcels separated by a controlled target gap.

Figure 15:
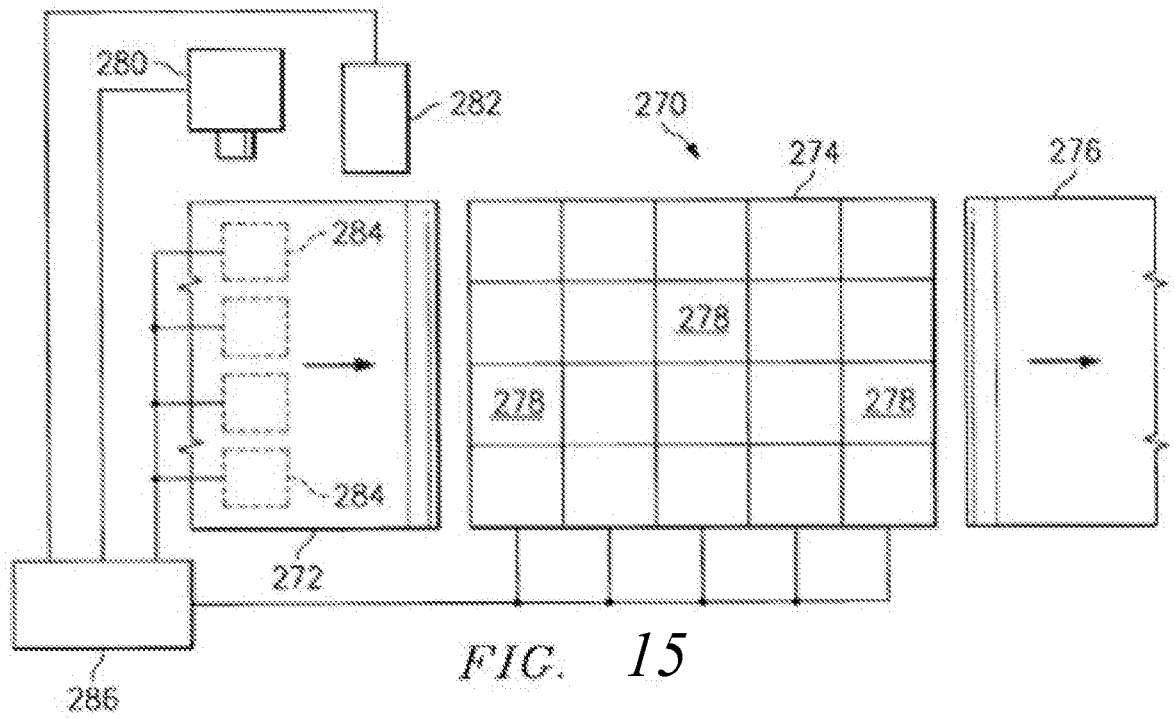
FIG. 15 illustrates one example of a control system in accordance with disclosed embodiments.

FIG. 15 schematically illustrates one example of a control system 270 for use in connection with the selective advance intelligent singulator. As shown, a feed conveyor 272 upstream of singulator 274 is equipped with image information capturing devices (detection system) such as one or more cameras 280, and/or vertical and/or horizontal sensors 282 and/or an array of pressure sensing devices 284, as desired. These or similar devices are utilized to capture image information corresponding to a stream of disordered parcels to be singulated.

The captured image information is transmitted to a computer or microprocessor 286 where the information is interpreted and/or transformed through the use of preprogrammed algorithms. Alternatively, this data collection means by be replaced by the use of pallet layer placement information in conjunction with a data base.

As shown, singulator 274 is represented as an array of discreet points or locations 278, each of which correspond to a conveyors 20. The various conveying devices illustrated herein and discussed in connection therewith may be advantageously utilized at each of the locations 278 as conveyors. Multiple devices of the type shown herein may also be utilized as conveyors 20 in a similar fashion.

Each conveyors 20 positioned at locations 278 may be discretely and intelligently controlled by microprocessor 286 so as to vary the speed or parcels being transported across the singulator 274 and transform a disorganized stream of material into an orderly flow of single parcels separated by a controlled target gap as discussed herein. Additional cameras 280 and/or sensors 282, 284 may also be used in connection with the singulator 274 to monitor and control the operation of the system. It will also be appreciated that while various belt and roller conveying devices have been disclosed in connection with the invention, it is contemplated that other material transporting devices may also be used, as well as variations of the belt and roller devices disclosed herein.

Figure 16:
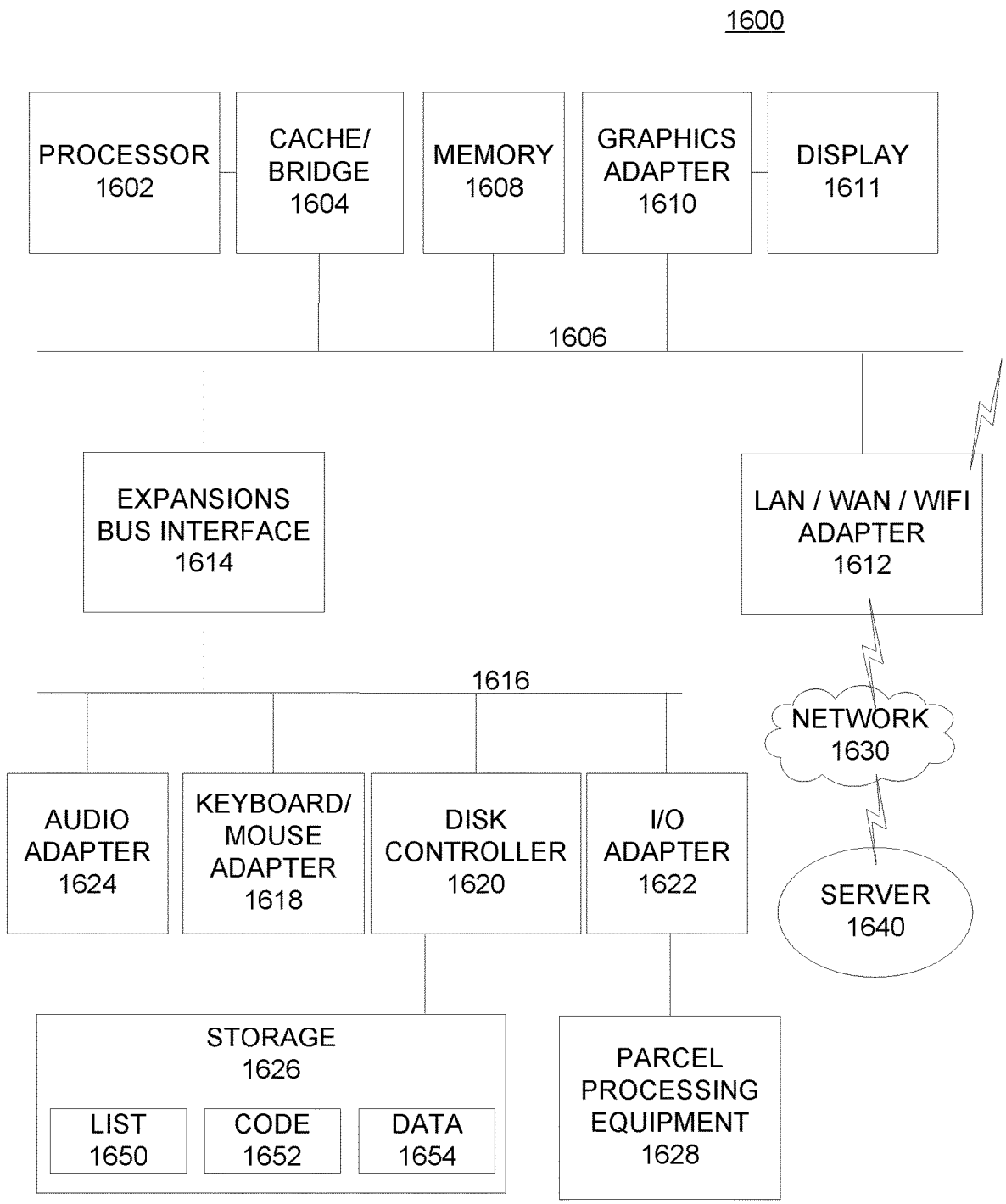
FIG. 16 depicts a block diagram of a data processing system with which an embodiment can be implemented.

FIG. 16 depicts a block diagram of a data processing system 1600 with which an embodiment can be implemented, for example as a system for implementing any of the devices, methods, or systems described herein, and can be configured to perform processes as described herein, and in particular can be used as the control system for a parcel processing system as described herein. In particular, data processing system 1600 can perform any functions or include any additional devices as described above with respect to FIG. 15.

The data processing system depicted includes a processor 1602 connected to a level two cache/bridge 1604, which is connected in turn to a local system bus 1606. Local system bus 1606 may be, for example, a peripheral component interconnect (PCI) architecture bus. Also connected to local system bus in the depicted example are a main memory 1608 and a graphics adapter 1610. The graphics adapter 1610 may be connected to display 1611.

Other peripherals, such as local area network (LAN)/Wide Area Network/Wireless (e.g. WiFi) adapter 1612, may also be connected to local system bus 1606. Expansion bus interface 1614 connects local system bus 1606 to input/output (I/O) bus 1616. I/O bus 1616 is connected to keyboard/mouse adapter 1618, disk controller 1620, and I/O adapter 1622. Disk controller 1620 can be connected to a storage 1626, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. Storage 1626 can store, for example, the list 1650 discussed above, any executable instructions or other code 1652, and any other data 1654 useful in performing the processes described herein, other parcel-processing processes, or other processes, including but not limited to gap data, position data, pitch data, speed factor data, speed data, parcel identification data, centerline data, centerpoint data, or other data.

I/O adapter 1622 can be connected to control or communicate with parcel processing equipment 1628, which can include transport devices or conveyors, sensors, booms, sorters, gappers, singulators, diverters, recirculators, or any other hardware disclosed herein or other hardware devices for processing parcels in accordance with the various embodiments described herein.

Also connected to I/O bus 1616 in the example shown is audio adapter 1624, to which speakers (not shown) may be connected for playing sounds. Keyboard/mouse adapter 1618 provides a connection for a pointing device (not shown), such as a mouse, trackball, trackpointer, etc. as well as for keyboard or other user entry devices. In particular, a system as illustrated in FIG. 16 can receive any user interaction or user entry of relevant data, such as a desired (target) spacing, gapping, or pitch distance, a selection of whether the singulation should be based on gap, pitch, centerline/centerpoints, or any other input or configuration information useful for the processes described herein.

Those of ordinary skill in the art will appreciate that the hardware depicted in FIG. 16 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 1612 can be connected to a network 1630 (not a part of data processing system 1600), which can be any public or private data processing system network or combination of networks, as known to those of skill in the art, including the Internet. LAN/WAN/Wireless adapter 1612 can also communicate with packages as described herein, and perform other data processing system or server processes described herein. Data processing system 1600 can communicate over network 1630 with one or more server systems 1640, which are also not part of data processing system 1600, but can be implemented, for example, as separate data processing systems 1600. A server system 1640 can be, for example, any of the other systems described herein, and so indicates how systems can intercommunicate over network 1630.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto. For example, various embodiments include systems, methods, and computer-readable media.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise. Similarly, various elements of the systems and apparatuses described herein can be duplicated, rearranged, or omitted in various embodiments, unless described or claimed otherwise.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A method for singulating parcels, comprising:
receiving an input stream of a plurality of parcels including at least a leading parcel and a lagging parcel in a singulator system;
updating position information of the leading parcel and the lagging parcel on a list;
determining a leading speed of the leading parcel;
determining an actual gap between the leading parcel and the lagging parcel;
determining a speed factor between the leading parcel and the lagging parcel;
setting a lagging speed of the lagging parcel according to the leading speed and the speed factor; and
controlling conveyors to transport the leading parcel at the leading speed and to transport the lagging parcel at the lagging speed;
wherein the lagging speed is calculated as the ratio of the actual gap to a target gap, multiplied by the leading speed.

2. The method of claim 1, wherein the speed factor is a ratio of the actual gap to a target gap.

3. The method of claim 1, wherein the speed factor is a ratio of an actual pitch to a target pitch.

4. The method of any of claim 1, wherein the method is repeated for each of the plurality of parcels.

5. The method of claim 2, wherein the target gap is preconfigured based on requirements of downstream equipment.

6. The method of claim 1, wherein the leading speed is a predetermined maximum speed at a time the leading parcel exits the singulator.

7. The method of claim 1, wherein the leading speed of the leading parcel is a lagging speed of a previous iteration of the method.

8. The method of claim 1, wherein, based on the leading speed and the lagging speed, the actual gap between the leading parcel and the lagging parcel is substantially equal to a target gap when the leading parcel and the lagging parcel exit the singulator.

9. The method of claim 1, wherein the method is performed repeatedly and at a repetition rate sufficient that each of the plurality of parcels is adjusted substantially concurrently and continuously.

10. A parcel singulator system, comprising:
- a plurality of conveyors, and
- a control system connected to control the plurality of conveyors, wherein the control system is configured to perform a method as claimed in claim 1.

11. A non-transitory computer-readable medium storing executable instructions that, when executed, cause a control system of a parcel singulator system to perform a method as claimed in claim 1.

* * * * *

UNITED STATES PATENT AND TRADEMARK OFFICE
CERTIFICATE OF CORRECTION

| | |
|---|---|
| PATENT NO. | : 12,012,291 B2 |
| APPLICATION NO. | : 17/428411 |
| DATED | : June 18, 2024 |
| INVENTOR(S) | : Ahmad Elmardini |

It is certified that error appears in the above-identified patent and that said Letters Patent is hereby corrected as shown below:

In the Specification

Column 1, Line 20:
After "parcels" insert -- , --

Column 1, Line 33 (1st occurrence):
"sort" should be – sorter –

Column 4, Line 30:
After "position" insert -- of --

Column 4, Line 66:
"parcels" should be – parcel –

Column 5, Line 11:
"the" should be – to –

Column 5, Line 18:
Delete "a" (2nd occurrence)

Column 5, Line 25:
After "enabled" insert -- to --

Column 5, Line 29:
"system" should be – systems –

Column 6, Line 18:
"The while" should be – While –

Signed and Sealed this
Fifth Day of November, 2024

Katherine Kelly Vidal
*Director of the United States Patent and Trademark Office*

Column 7, Line 6:
"closes" should be – closest –

Column 7, Line 21:
Delete "it"

Column 8, Line 3:
"case" should be – cases –

Column 8, Line 36:
"to" should be – into –

Column 8, Line 44:
"is" should be – in –

Column 8, Line 63:
Delete "to"

Column 9, Line 49:
Delete "process" (2nd occurrence)

Column 10, Line 3:
Delete "move"

Column 10, Line 47:
"parcels" should be – parcel –

Column 11, Line 15:
"illustrate" should be – illustrated –

Column 11, Lines 15-16:
Delete "is illustrated"

Column 11, Line 24:
"360.degree." should be – 360 degrees –

Column 11, Lines 35-37:
"that the conveyed material," should be – that convey material, –

Column 11, Line 44:
"where as" should be – whereas –

Column 11, Line 44:
"maybe" should be – may be –

CERTIFICATE OF CORRECTION (continued)
U.S. Pat. No. 12,012,291 B2

Column 11, Line 62:
Delete ", is shown"

Column 12, Line 13:
"maybe" should be – may be –

Column 12, Line 28:
Delete "be"

Column 12, Line 28:
"engaged" should be – engage –

Column 12, Line 29:
"is" should be – are –

Column 13, Line 6:
"maybe" should be – may be –

Column 13, Line 15:
"maybe" should be – may be –

Column 13, Line 26:
"conveyors" should be – conveyor –

Column 13, Line 31:
"maybe" should be – may be –

Column 13, Line 33:
Delete "are" (1st occurrence)

Column 13, Line 61:
"by" (1st occurrence) should be – may –

Column 13, Line 64:
"discreet" should be – discrete –

Column 15, Line 54:
Delete "a"

In the Claims

Column 16, Claim 4, Line 52:
Delete "any of"